United States Patent [19]
Hanley

[11] Patent Number: 5,230,177

[45] Date of Patent: Jul. 27, 1993

[54] FLY TYING TOOL AND BRAIDING HEAD ATTACHMENT

[76] Inventor: William Hanley, 8804 Blossom La., Louisville, Ky. 40202

[21] Appl. No.: 826,981

[22] Filed: Jan. 28, 1992

[51] Int. Cl.$^5$ .............................................. A01K 85/00
[52] U.S. Cl. ......................................................... 43/1
[58] Field of Search ............... 43/1; 287/17; 242/7.01, 242/7.14, 1; 269/97, 254 GS

[56] References Cited

U.S. PATENT DOCUMENTS

| | | | |
|---|---|---|---|
| 2,120,571 | 6/1938 | Reichenstein | 43/1 |
| 2,486,142 | 10/1949 | Fong | 43/1 |
| 4,184,645 | 1/1980 | Starling | 43/1 |
| 4,870,772 | 10/1989 | Johns | 43/1 |

*Primary Examiner*—Kurt C. Rowan

[57] ABSTRACT

A fly tying tool and optional braiding head attachment therefore for slidable mounting on a conventional fish fly hook holding device is disclosed. The tool features a body member containing a cylindrical bore therethrough which permits the member to be slidably mounted on the shaft of a fly hook holding vise such that the vise jaws project out of one end of the member. A plurality of elongate wire arms are tiltably attached to the body member such that they can be tilted between operative fly tying positions and retracted, storage positions. The tool also includes a guide collar which is removably attachable to a threaded end portion of the body member, the elongated outwardly opening grooves spaced apart therearound for confining the wire arms in the grooves when the arms are in their operative positions relative to the vise jaws. A braiding head attachment is disclosed which includes a cap with a series of radially projecting arms, which cap is threadably attachable to the threaded end portion of the body member in place of the guide collar when needed, in which event the wire arms are placed in their retracted positions.

9 Claims, 2 Drawing Sheets

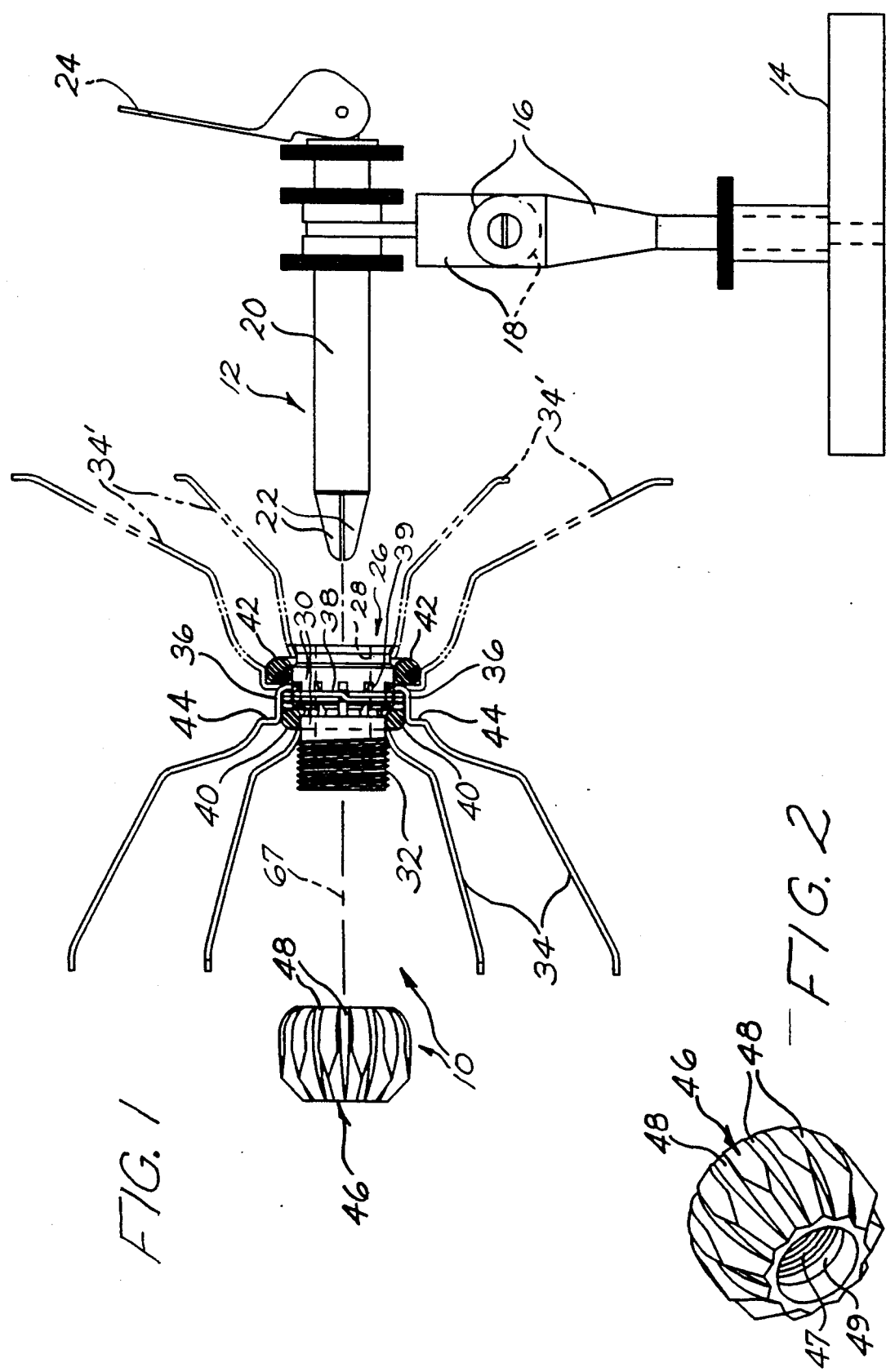

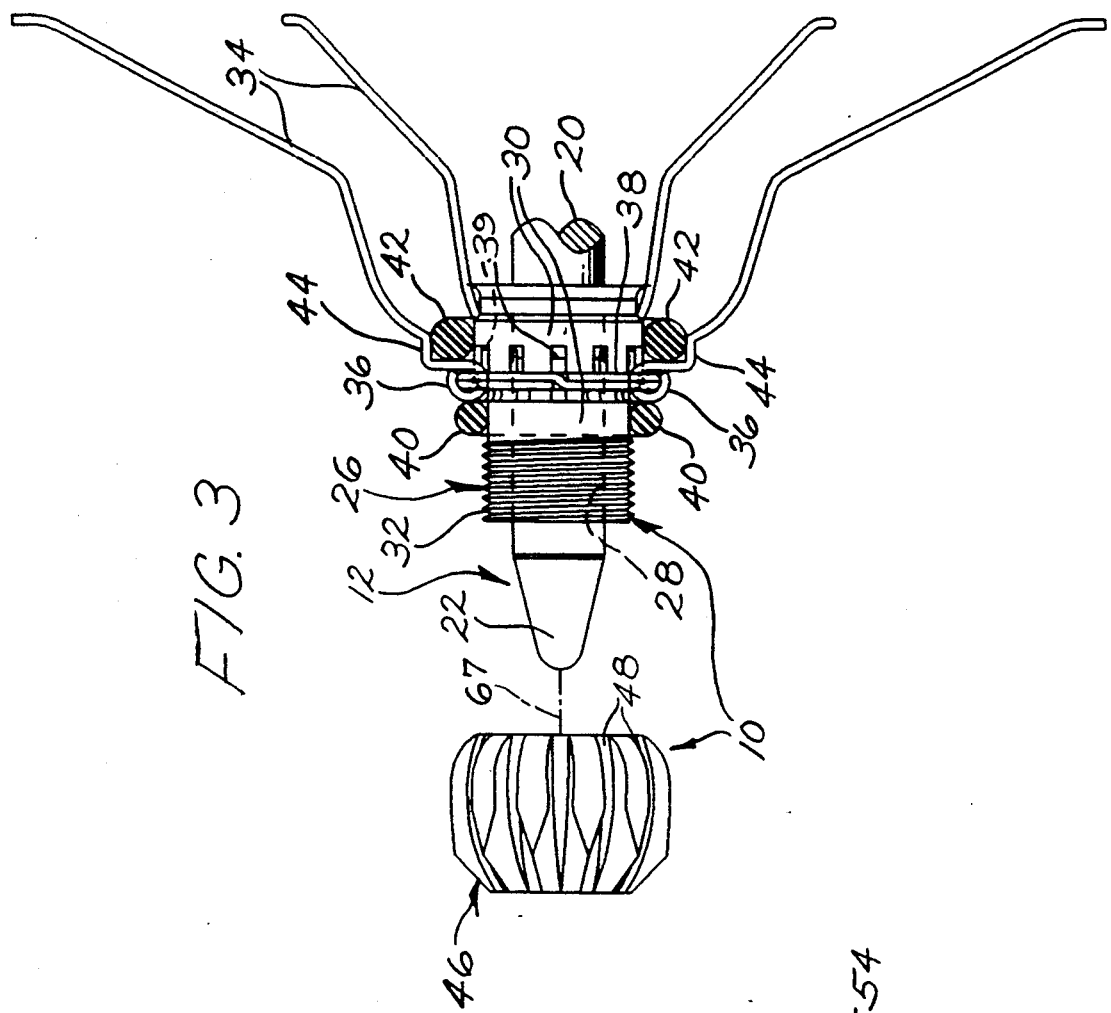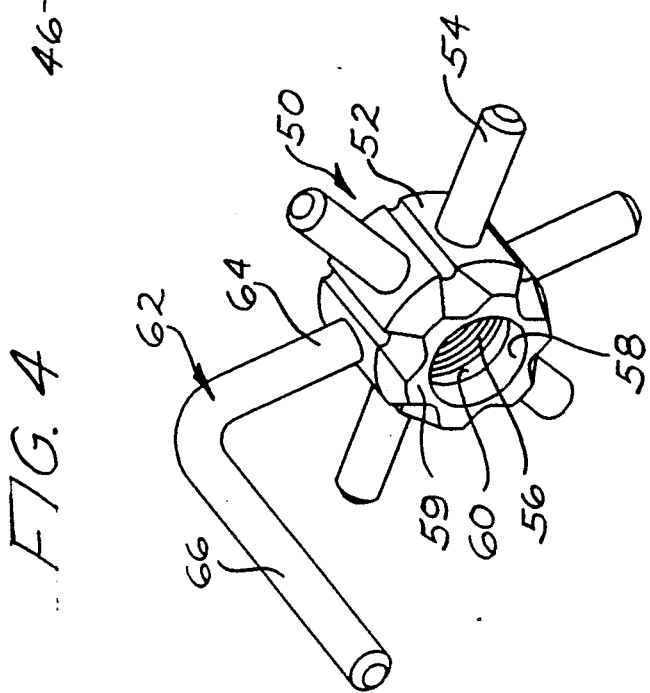

FLY TYING TOOL AND BRAIDING HEAD ATTACHMENT

BACKGROUND OF THE INVENTION

This invention relates generally to a tool for use in the tying of fishing flies and to a braiding head attachment therefor for use in the braiding and weaving of a wide variety of artificial fishing lures. More specifically, the invention relates to a fly tying tool which is mountable on a conventional fish fly hook holding vise, whereby the tool and braiding head attachment can be used in conjunction with the vise.

Broadly speaking, tools for use in the tying of artificial fishing flies have long been known and used in the prior art. See, for example, the fly tying machines, devices and tools disclosed in U.S. Pat. No. 2,332,655 issued to W. C. Miles on Oct. 26, 1943; U.S. Pat. No. 4,870,772 issued to R. R. Johns on Oct. 3, 1989; and U.S. Pat. No. 4,169,562 issued to A. Renzetti on Oct. 2, 1979. The motorized machine disclosed in the Miles patent is a relatively complex device employing many component parts. The device shown in the Johns patent is a much less complex knot tying tool attachable to a thread bobbin wherein a knot is tied on the end of a movable barrel placed near the eye of a fish hook. The end of the barrel is then placed over the eye of the hook and the knot is slid onto the hook shank. The thread is then severed and the barrel is retracted. Accordingly, the Johns device is merely a tool for facilitating the tying of a simple knot on a hook shank and does not provide means for facilitating the tying of a wide variety of different types of lures thereon.

The Renzetti patent is perhaps the most pertinent of the aforementioned references in that it shows a fly tying device including an elongated right angled arm containing a thread cradle on a free end thereof, and a fly hook holding vise aligned for passing a thread through the cradle to manually wrap about the shank of a hook held in the vise. The reference tool also includes a spiral spring clip disposed on a vise supporting arm in which feathers can be held temporally until selected for tying to the vise held fish hook. Here, again, the Renzetti tool does not provide means for threading the hook to facilitate the tying of a wide variety of different types of lure configurations. It simply provides for holding a hook stationary relative to the thread cradle to permit the use of both hands in performing complex fly tying operations.

The device of my invention is adapted for use in conjunction with a standard fly tying vise which, like the Renzetti device, permits the use of both hands in performing complex fly tying and lure weaving operations on a vise held fish hook. But, in addition, my device provides means for guiding one or more threads, including threads of different colors and sizes to facilitate tying lures of a virtually endless number of configurations, sizes, shapes and color combinations.

SUMMARY OF THE INVENTION

It is an object of my invention to provide a novel fly tying tool for use in conjunction with a fish fly hook holding clamp or vise.

It is another object of my invention to provide a novel fly tying tool for use in conjunction with such a vise which also includes a removably attachable braiding head.

Briefly, in accordance with my invention, I provide a fly tying tool for use in conjunction with a fish fly hook holding device. The tool includes a body member which is removably attachable to a fish fly hook holding device. A plurality of elongated arms are attached on corresponding ends thereof to the body member, and the arms are circumferentially spaced apart around the body member when the arms are disposed in operative, fly tying positions relative to the hook holding device. The tool also includes guide means attached to the body member for maintaining the arms in their operative positions.

These and other objects, features and advantages of the present invention will become apparent to those possessing skill in the art from the following detailed description and attached drawings upon which, by way of example, only a single preferred embodiment of my invention is illustrated.

BRIEF DESCRIPTION OF THE DRAWINGS

FIG. 1 shows a side elevation view of a fly tying tool aligned for slidable mounting on the vise shaft of a conventional fish fly hook holding device, thus illustrating a preferred embodiment of my invention.

FIG. 2 shows an enlarged side elevation view of a portion of the holding device of FIG. 1 with a body member of the fly tying tool of the latter figure shown mounted thereon.

FIG. 3 shows a side elevation view of one of the several wire fly tying legs of the tool of FIGS 1-2.

FIG. 4 shows an end view, of a braiding head for use on the body member of the fly tying tool of FIGS. 1-2, thus illustrating an optional, additional feature of my invention.

DESCRIPTION OF THE PREFERRED EMBODIMENT

Referring now to the drawing figures there is shown, in one preferred embodiment of my invention, a novel fly tying tool 10 for use in conjunction with a conventional fish fly hook holder or vise 12. The vise 12 may be of any suitable type such as, for example, a Thompson brand vise as currently sold in this country by Dan Bailey's Fly Shop of Livingston, Mont. Such a vise 12 is illustrated in FIG. 1 and includes a base 14, an upstanding post 16 attached to the base 14, a vertically pivotal upper post section 18, an elongated, generally cylindrically shaped shaft 20 attached on a rear end portion thereof to the post section 18, a pair of vise jaws 22 projecting out of a forward end of the shaft 20, and a cam lever 24 operatively connected through the shaft 20 to the jaws 22 and depending from a rear end of the shaft 20. The vise jaws 22 are adapted to tightly grip the curved hook portion of a fish fly hook by adjustment of the lever 24 through an arc relative to the longitudinal axis of the shaft 20. The vise jaws 22 can also be rotated to rotate the fly hook contained therein by rotating the cam lever 24 about the longitudinal axis of the shaft 20.

The novel fly tying tool 10 of the present example includes an elongated, generally cylindrically shaped body member 26 containing an elongated, hollow, cylindrically shaped, smooth surface bore 28 extending longitudinally therethrough. The body member 26 is thereby adapted for slidable mounting on a forward end portion of the vise shaft 20 in relatively close fitting relation therewith such that the vise jaws 22 project just beyond a forward end thereof as illustrated in FIG. 3. The body member 26 also includes a smooth surfaced exterior portion 30 and an exteriorly threaded forward end portion 32 and may be constructed of any suitable material such as metal or plastic, for example.

The tool 10 also includes a plurality of elongated arms 34 attached on corresponding ends thereof to and around the smooth body portion 30 so as to extend forwardly beyond the end of the vise jaws 22 and so as to tilt radially outwardly from the common longitudinal axis of the shaft 20 and body member 26. The arms 34 may vary in number from as few as two up to as many as may be desired, depending upon the complexity of the fly tying task to be undertaken. The arms 34 may be formed of any suitable gaged material sufficient to permit them to remain relatively rigid while in use as fly string tying posts, but should preferably be bendable by hand for the convenience of the individual user. The material forming the arms 34 may, for example, be suitably gaged wire with or without an insulative coating. Where coated wire is used, each of the arms 34 may be of a different color for ease of individual identification. This feature is advantageous when tying flies which have several different thread components. The arms 34 may be secured to the body portion 30 in any suitable manner. Where the body member 26 is constructed of molded plastic, for example, a series of plastic tabs which may be molded to and around the smooth portion 30 which contain holes through which looped end portions or eyes 36 of the arms 34 can be inserted and thus retained. In the present example, I use a retaining band in the form of a standard metal split ring 38 and connect the looped end portions 36 of the various arms 34 in circumferentially spaced apart relation thereto around the body member 26. The looped end portions 36 fit in circumferentially spaced apart slots 39 formed in a surface of the body portion 30 (See FIG. 3).

Such arrangements for connection of the arms 34 to the body member 26 readily permit the arms 34 to be tilted about their connection points from a forwardly projecting, operative position as shown in full at 34 in FIG. 1 to a rearwardly projecting storage position as shown in phantom at 34' in the same figure, which is an additional, optional feature of my invention. To maintain the arms 34 in either one of these two conditions in a stable manner, a pair of compressible, resilient O-rings 40 and 42 are applied around the smooth body portion 30 snugly against the retaining band 38, and an L-shaped bend 44 is formed in each of the arms 34 next to it's looped end 36 which conforms to the O-ring 40 or 42 over which it extends, depending on whether the arm 34 is in its operative or retracted position.

The tool 10 also includes a guide means attached to the body member 26 for maintaining the arms 34 in their operative, fly tying positions which, in the present example, comprises a collar 46 which is internally threaded as at 47 (See FIG. 2) in conformity with the threaded body portion 32 for removable connection thereto. A series of elongated, outwardly opening grooves 48 which extend longitudinally with respect to the shaft 20 are circumferentially spaced apart on and around the collar 46 so that each of the arms 34 can be confined in it's own one of the grooves 48 when in it's operative position. A flexible, resilient O-ring 49 is disposed within the collar 46 around a forward opening thereof which is compressed by a forward end of the threaded body portion 32 to tighten the collar 46 on the body member 26. The collar 46 thus tends to stabilize each of the forwardly projecting arms 34 during a fly tying procedure.

Now with reference to the drawing figures but particularly with reference to FIGS. 4, a braiding head assembly 50 for use with the body member 26 as an additional feature of my invention will now be explained. The assembly 50 includes cylindrically shaped body portion or cap 52 which is threadably attachable to the threaded end portion 32 of the body member 26 in place of the arm guide collar 46. A series of circumferentially spaced apart, radially projecting legs 54 are attached to and around the cap 52 to provide posts for the weaving or braiding of a fly or other type of lure on the shank of a fish hook held in the vise jaws 22. The cap 52 contains interior threading 56 conforming to the threaded portion 32 of the member 26 and a circular opening 58 on a forward end 59 to permit the vise jaws 22 to extend therethrough when the cap 52 is attached to the body member 26 in place of the collar 46. A compressible, resilient O-ring 60 is disposed within the cap 50 against the interior surface of the forward end 59 around the opening 58. The O-ring 60 is compressed between the end 59 and a forward end of the body member 26 as the threaded portion 32 is advanced into the cap 50 to lock the interleaving threads of the body member and cap tightly together. One or more of the legs 54 may be L-shaped as in the case of the leg 62 which has a radially projecting portion 64 and a longitudinally extending portion 66 extending parallel with a common longitudinal axis 67 of the shaft 20, body member 26 and cap 52. When the braiding head 50 is used with the member 26, the collar 46 must first be removed and the fly tying arms 34 should be tilted to their retracted storage positions as shown in FIG. 1 at 34'.

The tool 10 with it's arms 34, when used in conjunction with the hook holding device 12 or other suitable vise, facilitates the tying of an enormous variety of artificial fishing lures of the fly type. Moreover, by using the body member 26 in conjunction with such a vise and with the braiding head 50 (with the arms 34 disposed in their retracted positions 34'), a wide variety of additional types of fishing lure configurations can be fashioned on the shank of a hook held by the vise.

Although the present invention has been described with respect to specific details of a single preferred embodiment thereof, it is not intended that such details limit the scope of this patent other than as specifically set forth in the following claims.

I claim:

1. A fly tying tool for use in conjunction with a fish fly hook holding device comprising a body member which defines a hollow, cylindrically shaped bore therethrough adapted to slidably fit upon a cylindrically shaped mounting shaft of a fish fly holding device for exposure of said device beyond a forward end of said member such that a plurality of elongated arms attached to said member are concentrically disposed about said device when in their operative positions.

2. The fly tying tool of claim 1 with a guide means attached to said body member for maintaining said arms in said operative positions wherein said guide means comprises a collar defining a series of longitudinally extending, circumferentially spaced apart grooves therein said series being at least equal in number to said plurality, for confining said arms therein when said arms are in their operative positions.

3. The fly tying tool of claim 1 further comprising lure braiding means removably attached to a forward end portion of said body member for use when said arms are in retracted positions wherein said braiding means comprises a cylindrically shaped body portion removably attached to said body member, and a group of circumferentially spaced apart, radially projecting legs attached to said body portion.

4. The fly tying tool of claim 3 wherein one of said legs contains a radially projecting proximal end portion and a longitudinal extending distal end portion, said distal end portion extending forwardly of said body portion and at a right angle to said radially extending proximal end portion.

5. The fly tying tool of claim 3 wherein said body portion defines an interiorally threaded hollow interior defining surface for threadable attachment to a threaded forward end portion of said body member.

6. The fly tying tool of claim 5 wherein a hollow interior of said body portion contains an annularly shaped compressible, resilient element disposed in a forward end portion thereof for tight seating of interleaving threads of said body member and body portion when a forward end of said body member presses said element against a forward end of said hollow interior defining surface.

7. The fly tying tool of claim 2 wherein said body member includes a cylindrically shaped, exteriorly threaded, forward end portion, and said collar further defines a hollow bore therethrough which is interiorally threaded in conformity with the exteriorally threaded body member end portion such that said collar is threadably attachable to said body member.

8. The fly tying tool of claim 7 wherein said guide means further comprises a compressible, resilient O-ring removably disposed in a forward end portion of said bore in registry with an end of said threaded end portion of said body member.

9. The fly tying tool of claim 2 wherein said arms are pivotally attached to said body member for permitting said arms to be tilted between said operative positions and retracted, inoperative, storage positions wherein said arms project rearwardly of said body member, and further comprising a first compressible, resilient O-ring disposed around said body member next to and forwardly of the annulus of attachment of said arms to said body member for interacting with said arms to lock said arms in an operative position, and a second compressible, resilient O-ring disposed around said body member next to and rearwardly of said attachment annulus for interacting with said arms to lock said arms in a rearwardly projecting retracted position.

* * * * *